(12) United States Patent
Matta

(10) Patent No.: US 7,616,191 B2
(45) Date of Patent: Nov. 10, 2009

(54) ELECTRONIC DEVICE AND METHOD FOR SIMPLIFYING TEXT ENTRY USING A SOFT KEYBOARD

(75) Inventor: Farid Matta, Los Altos, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 589 days.

(21) Appl. No.: 11/108,261

(22) Filed: Apr. 18, 2005

(65) Prior Publication Data

US 2006/0232551 A1  Oct. 19, 2006

(51) Int. Cl.
G06F 3/02 (2006.01)

(52) U.S. Cl. .................................................. 345/168

(58) Field of Classification Search ................ 345/168, 345/156, 157, 169; 382/230; 715/700
See application file for complete search history.

(56) References Cited

U.S. PATENT DOCUMENTS

| 5,479,191 | A | * | 12/1995 | Komatsu ..................... 345/161 |
| 5,771,037 | A | | 6/1998 | Jackson |
| 5,963,671 | A | | 10/1999 | Comerford |
| 6,073,036 | A | * | 6/2000 | Heikkinen et al. ........ 455/550.1 |
| 6,084,570 | A | * | 7/2000 | Milroy ........................ 345/157 |
| 6,278,440 | B1 | | 8/2001 | Katsurahira et al. |
| 6,377,965 | B1 | | 4/2002 | Hachamovitch et al. |
| 6,859,908 | B1 | | 2/2005 | Clapper |
| 7,429,976 | B2 | | 9/2008 | Harley et al. |
| 2002/0145587 | A1 | * | 10/2002 | Watanabe ..................... 345/156 |
| 2002/0196238 | A1 | * | 12/2002 | Tsukada et al. ............. 345/173 |
| 2003/0234766 | A1 | * | 12/2003 | Hildebrand ................. 345/168 |
| 2004/0183833 | A1 | | 9/2004 | Chua |
| 2006/0146009 | A1 | * | 7/2006 | Syrbe et al. ................. 345/156 |

FOREIGN PATENT DOCUMENTS

| JP | 08249122 A | * | 9/1996 |
| WO | WO-97/17827 | | 5/1997 |

OTHER PUBLICATIONS

Williamson, J. and R. Murray-Smith, "Dynamics and Probabilistic Text Entry," Technical Report, Dept. Computing Science, University of Glasgow (Jun. 11, 2003).

* cited by examiner

*Primary Examiner*—Amr Awad
*Assistant Examiner*—Stephen G Sherman

(57) ABSTRACT

An electronic device predicts a target key on a soft keyboard for selection by a user and enlarges the target key to make it easier for the user to select the target key. The electronic device includes a display that displays a cursor and keys that constitute a soft keyboard and a cursor control device for controlling movement of the cursor on the display. The electronic device further includes a processor operable to receive a cursor control signal representing movement of the cursor on the display from the cursor control device. In response to the cursor control signal, the processor predicts one of the keys likely to be next selected as the target key and enlarges the target key relative to other keys on the display.

20 Claims, 4 Drawing Sheets

ELECTRONIC DEVICE AND METHOD FOR SIMPLIFYING TEXT ENTRY USING A SOFT KEYBOARD

BACKGROUND OF THE INVENTION

Manufacturers of hand-held and/or portable electronic devices, such as laptop computers, personal digital assistants (PDA), wireline or wireless telephones, video games and other similar electronic devices, continually strive to add new features and applications to their products. Many of these new features and applications require, or can be enhanced by, the ability to enter text directly into the device, instead of downloading the text from another device, such as a computer or server. For example, the majority of wireless telephones on the market today offer a text messaging application and a phone book feature, both of which require text entry directly into the device.

The prevailing text entry method in wireless telephones is the existing twelve-key numeric pad, which is used to input 10 decimal digits and 26-33 characters of the alphabet, depending on the language. Multiple alpha-numeric characters are assigned to each key, and selection of a particular character requires the user to potentially press a key multiple times at a certain pace. Although the keypad text entry method does enable a user to enter text directly into an electronic device, the keypad text entry method is slow and has a fairly long learning curve.

Another text entry method available in some electronic devices is a software-defined keyboard ("soft keyboard") displayed on the electronic device display. Soft keyboards can be either pen-based, in which the user employs a stylus to tap and select a key, or cursor-based, in which the user moves a cursor to a desired key using a navigation (or cursor control) device on the electronic device and selects the key by pressing a "Select" button, an "Enter" button or another similar selection mechanism.

One traditional cursor control device for controlling the position of a cursor on a display is a four-directional rocker-switch (e.g., arrow buttons). With a rocker-switch, the user selects a particular key on the soft keyboard by using the arrow buttons to move through a Manhattan grid of characters on the display. Although such traditional cursor control devices are highly accurate, rocker-switch cursor control devices suffer from slow text entry speed. Another type of cursor control device that provides improved speed over traditional cursor control devices is an omni-directional analog pointing device, such as a puck-type pointing device. Puck-type pointing devices are compact puck-shaped devices that may be manipulated by a user's finger to move within a puck field of motion. The position of the puck in the puck field of motion is sensed using a variety of electrical, electromagnetic and optical techniques, and the position of the puck is mapped to a cursor position on a display.

Examples of puck-type pointing devices are described in U.S. Pat. No. 6,084,570 to Milroy, entitled "Compact Cursor Controller Structure For Use With Laptop, Notebook and Hand-Held Computers and Keyboards," U.S. Pat. No. 5,771,037 to Jackson, entitled. "Computer Display Cursor Controller," U.S. Pat. No. 6,278,440 to Katsurahira et al., entitled "Coordinate Input Apparatus and Position-Pointing Device," and U.S. patent application Ser. No. 10/723,957 to Harley et al., entitled "Compact Pointing Device."

For analog-type cursor control devices (e.g., puck-type pointing devices) using soft keyboards, the speed of text entry depends on both the accuracy of the cursor control device and the size of a target key on the display. For a given accuracy of a cursor control device, the speed of text entry can be increased by enlarging one or more soft keys on the display. Various solutions have been proposed to enlarge keys on the display, thereby increasing the speed of text entry. For example, one proposed solution is a variable-width soft keyboard, in which the size of the key representing a letter is proportional to the frequency of use of that letter. For example, in the proposed solution, the frequently used e-key appears approximately five times larger than the rarely used z-key.

Although variable-width soft keyboards do significantly increase the text entry speed, increasing the width of a key improves the probability of contacting the key only in one direction. In addition, depending on the dexterity of the user, the difficulty in contacting the smaller keys (e.g., z, q, etc.) may offset the gain provided by the larger keys to an unpredictable degree. Therefore, what is needed is a key enlarging solution for a soft keyboard that increases the probability of selecting any key in any direction.

SUMMARY OF THE INVENTION

Embodiments of the present invention provide an electronic device for predicting a target key on a soft keyboard for selection by a user and enlarging the target key to make it easier for the user to select the target key. The electronic device includes a display displaying a cursor and keys constituting the soft keyboard and a cursor control device for controlling movement of the cursor on the display. The electronic device further includes a processor operable to receive a cursor control signal representing movement of the cursor on the display from the cursor control device. In response to the cursor control signal, the processor predicts one of the keys likely to be next selected as the target key and enlarges the target key relative to other keys on the display.

In one embodiment the processor is operable to determine a cursor velocity and a cursor acceleration in response to the cursor control signal and predict the target key when the cursor velocity is greater than zero and the cursor acceleration is less than or equal to zero.

In a further embodiment, the processor is operable to represent movement of the cursor by a cursor movement vector having a magnitude and a direction, represent lines between the current position of the cursor and centers of each of the keys as respective key center vectors having respective magnitudes and directions. The processor is further operable to define a set of keys such that the direction of the cursor movement vector is within an angular tolerance of the direction of the respective key center vector of each of the keys within the set. From the set, the processor is further operable to identify a potential key having a minimum of the magnitudes of the key center vectors with the keys in the set.

In still a further embodiment, the processor is operable to identify the potential key is selected as the target key when the minimum magnitude associated with the potential key is greater than a radius of an escribed circle of the potential key. In an additional embodiment, the processor is operable to monitor entry of a series of selected keys representing characters of a partial word and to identify the target key from the partial word.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS

Figure 1:
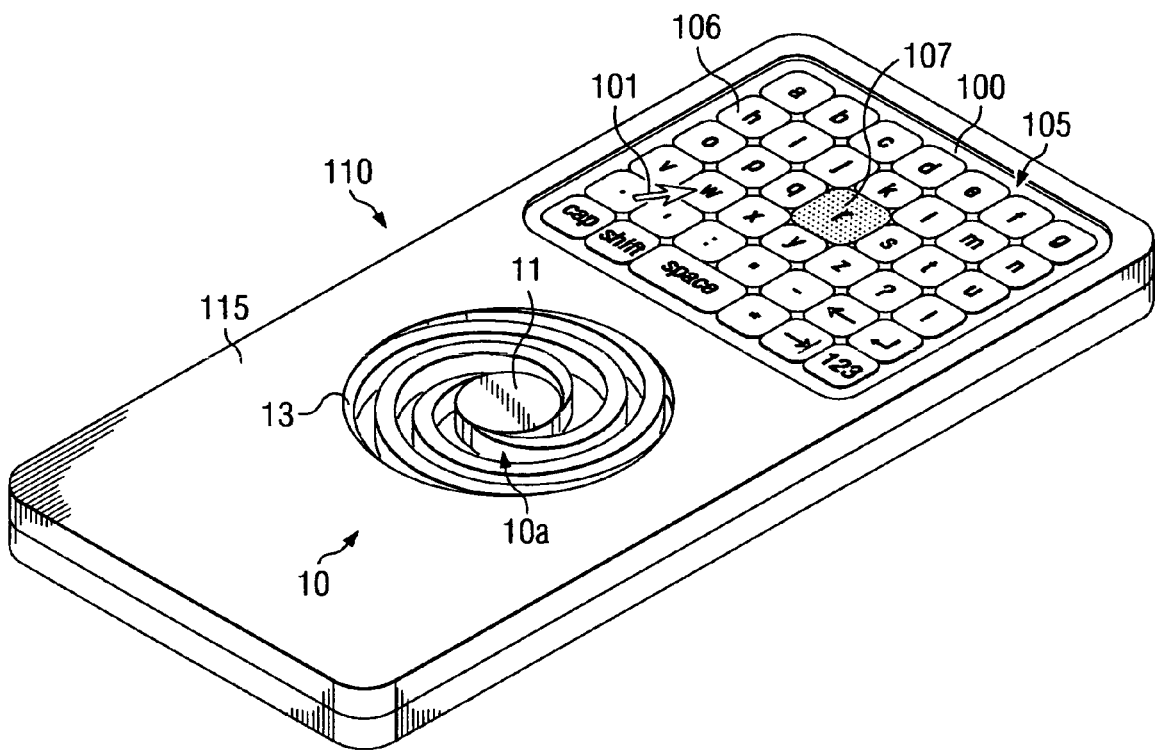
FIG. 1 is a pictorial representation of an exemplary electronic device including a cursor control device and a soft keyboard on a display thereof, in accordance with embodiments of the present invention.

FIG. 1 is a pictorial representation of an electronic device 110 implementing an exemplary cursor control device 10 and that, in at least one operating mode of electronic device 110, displays a soft keyboard 105 on a display 100, in accordance with embodiments of the present invention. The electronic device 110 shown in FIG. 1 is a wireless telephone, such as a cellular telephone or a handset of a cordless telephone. However, it should be understood that the present invention is applicable to any type of electronic device 110 in which a cursor control device 10 is operable to control movement of a cursor 101 on a soft keyboard of the electronic device 110. For example, various electronic devices 110 include laptop computers, personal digital assistants (PDAs), notebooks, hand-held video game devices, remote controls, portable music players or other similar electronic devices.

The cursor control device 10 in FIG. 1 is shown located on a top surface 115 of the wireless telephone 110. However, it should be understood that in other embodiments, the cursor control device 10 can be located on a side surface or bottom surface of the wireless telephone 110, or for other types of electronic devices, can be located on a different device in communication with the electronic device 110. For example, the cursor control device 10 can be located on a mouse-type device, a remote control, a keyboard or other similar device. The cursor control device 10 is operable to control the position of the cursor 101 on the soft keyboard 105 displayed on the display 100 of the wireless telephone 110.

The cursor control device 10 shown in FIG. 1 is a puck-type pointing device 10aa, although it should be understood that the present invention is applicable to other types of cursor control devices. The cursor control device 10 in FIG. 1 includes a puck 11 that is moveable in response to a force applied in a direction generally parallel to the top surface 115 of electronic device 100, hereinafter termed a "lateral" force applied to the puck 11. The magnitude and direction of movement of the puck 11 determines the magnitude and direction of movement of the cursor 101 on the display 100. The cursor control device 10 further includes springs 13 that connect the puck 11 to the top surface 115 of the wireless telephone 110. The springs 13 operate to return the puck 11 to a centered position upon release of the lateral force on the puck 11. Releasing the lateral force on the puck does not change current position of the cursor 101 on the display 100.

The soft keyboard 105 includes keys 106, each representing a particular alpha-numeric character, symbol or text entry function (hereinafter, collectively referred to as "characters"). The keys 106 are all equal in size prior to cursor 101 moving. When the cursor 101 is in motion and is approaching a particular character (e.g., the letter "r"), the key 106 representing that character is enlarged in both width and height to reduce the probability of the cursor 101 undershooting, overshooting or straying away from the key 106, thereby increasing the probability of the user successfully selecting the key 106.

The target key 107 is enlarged by an amount that depends on such features as the layout of the soft keyboard. 106, type of electronic device 110 and size of the display 100. For example, in one embodiment, the target key 107 is enlarged by an enlargement factor of thirty percent on each of its four sides to nearly double the area on the display 100 occupied by the enlarged target key 107, without overly crowding or overlapping neighboring keys 106. In one embodiment, the neighboring keys 106 surrounding the target key 107 are reduced in size by an amount proportional to the enlargement factor of the enlarged target key 107. In another embodiment, the enlargement factor is chosen so as to minimize hiding or occluding neighboring keys 106.

However, it should be understood that in other embodiments, the target key 107 can be enlarged by a different enlargement factor, by different enlargement factors in each dimension (width and height) or by different enlargement factors in each direction (e.g., each side of the target key 107 is enlarged by a different enlargement factor). In addition, the particular enlargement factor applied to each side of a target key 107 can vary among keys 106, among applications and/or among users. For example, the enlargement factor applied to each side of a target key 107 or the area enlargement factor applied to the target key 107 can be configured for individual keys 106 and/or individual applications by the user of the electronic device 110. As another example, the enlargement factor can be predetermined on an individual key 106 basis and/or an individual application basis by the manufacturer of the electronic device 110 and/or soft keyboard 105.

Figure 2A:
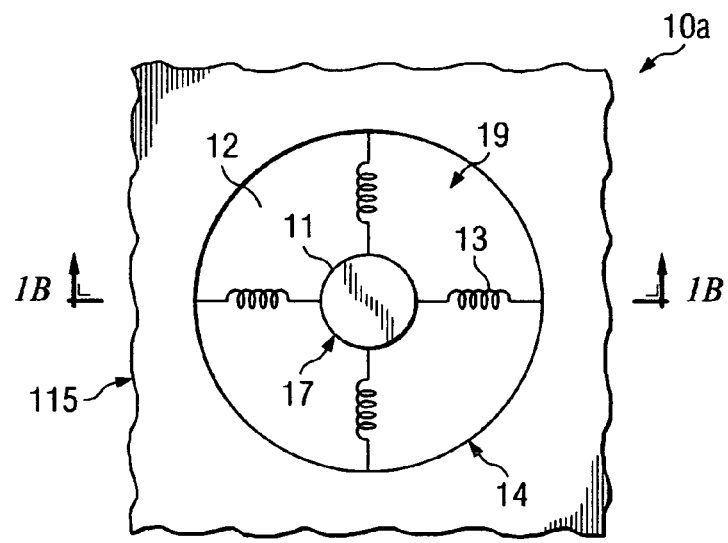
FIG. 2A is a top view of an exemplary cursor control device for controlling movement of a cursor on a display of the electronic device, in accordance with embodiments of the present invention.
Figure 2B:
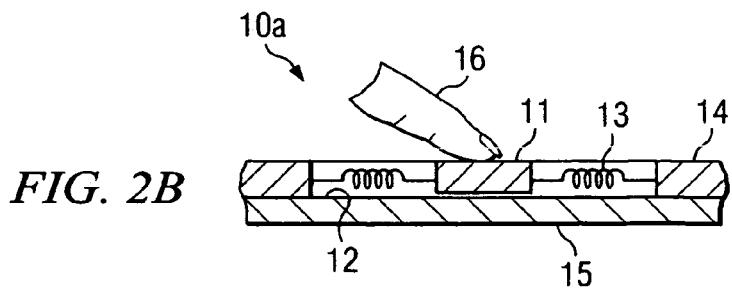
FIG. 2B is a cross-sectional view of the cursor control device of FIG. 2A, in accordance with embodiments of the present invention.

Referring now to FIGS. 2A and 2B, additional features of an exemplary cursor control device 10 for controlling cursor movement on the display of an electronic device are illustrate. In the example shown, the cursor control device 10 is embodied as a puck-type pointing device 10a. FIG. 2A is a schematic top view of the puck-type pointing device 10a and FIG. 2B is a cross-sectional view of the puck-type pointing device 10a. As discussed above in connection with FIG. 1, the puck-type pointing device 10a includes a puck 11 that is moveable over a surface 12 of a substrate 115 within a puck field of motion 19 in response to a lateral force applied to the puck 11. The lateral fore is typically applied to the puck 11 by a user's finger 16, finger tip, thumb, thumb tip or multiple fingers.

In one embodiment, the puck 11 includes a pressure sensor (not shown) that measures the pressure (i.e., a force applied in a direction generally orthogonal to the surface 115) applied to the puck 11 by the user, and the puck-type pointing device 10a includes a motion sensor (not shown) that determines the displacement of the puck 11 relative to the surface 12 in response to the lateral force applied to the puck 11 by the user. In one embodiment, the pressure sensor in the puck 11 is operable to sense two predetermined pressure levels. A first pressure level activates the tracking of the cursor 101 (shown in FIG. 1) on the display, as described above. In addition, the activation of the tracking of the cursor on the display due to the detection of the first pressure level also activates the motion sensor. A second pressure level provides a "click" function associated with a conventional mouse. For example, the user can click at the current position of the cursor by increasing the pressure applied to the puck 11 to greater than the second pressure level. In other embodiments, a tactile feedback mechanism can also be included in the puck 11 to provide to the user tactile feedback that indicates that the user has applied pressure at or above the second pressure level to activate the "click" function.

When the user releases the puck 11 by removing the user's finger 16, the puck 11 is returned to a center position 17 by the springs 13 that connect the puck 11 to a perimeter 14 of the puck field of motion 19. The perimeter 14 of the puck field of motion 19 is typically connected to the surface 115 of the electronic device on which the puck-type pointing device 10 is located. Since the user's finger 16 is not applying pressure to the puck 11 when the puck 11 is released, the pressure sensor is not activated during the return of the puck 11 to the center position 17, and any change in position associated with the return motion is not reported by the motion sensor to the electronic device.

Figure 3A:
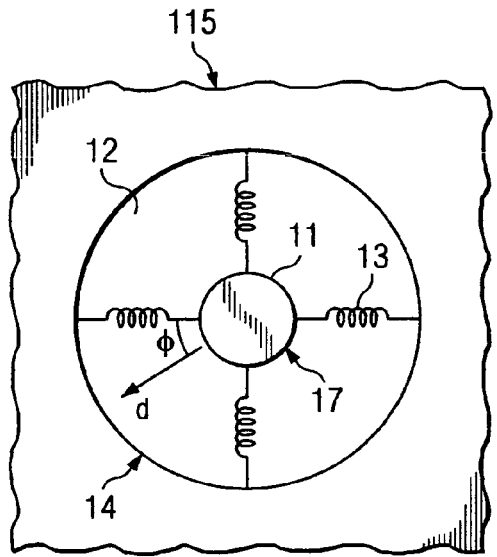
FIGS. 3A-3B illustrate cursor control by the cursor control device of FIGS. 2A and 2B, in accordance with embodiments of the present invention.
Figure 3B:
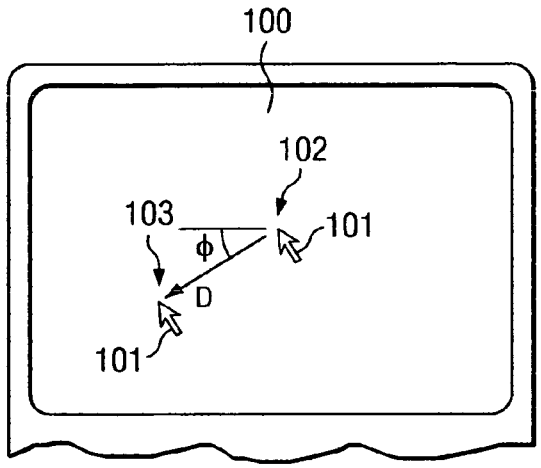

FIGS. 3A-3B illustrate cursor control by the puck-type pointing device of FIGS. 2A and 2B, in accordance with embodiments of the present invention. As discussed above, when the user applies pressure to the puck 11 that is greater than the predetermined first pressure level, any change in the lateral position of the puck 11 relative to the surface 12 is sensed by the motion sensor and reported to the electronic device of which the puck-type pointing device 10 forms a part. The reported change in position is used by the electronic device to move a cursor 101 on the display 100 by a magnitude and direction corresponding to the magnitude and direction of the motion of the puck 11.

For example, as shown in FIGS. 3A and 3B, if a vector representing the motion of the puck 11 is characterized by a magnitude d and a direction defined by an angle φ on the puck-type pointing device 10, a vector representing the motion of the cursor 101 from a current position 102 to a new position 103 on the display 100 is characterized by a magnitude D and a direction defined by an angle φ on the display 100. When the user releases the pressure on the puck 11, the puck 11 is returned to its centered position 17 by the springs 13 attached to the puck 11. Without pressure applied to the puck 11, the pressure sensor inhibits the motion sensor from reporting the change in position of the puck 11 to the electronic device. Therefore, the cursor 101 remains at position 103.

Figure 4:
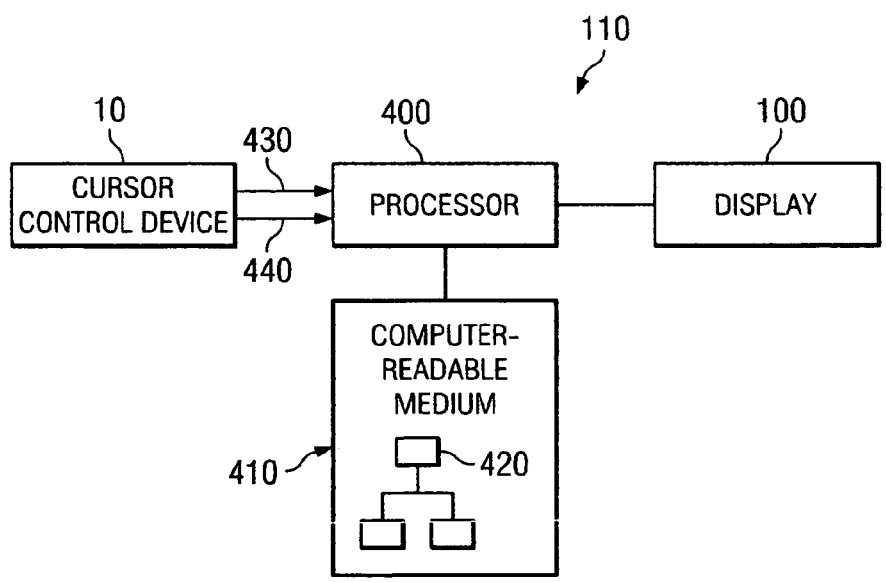
FIG. 4 is a block diagram of an exemplary electronic device capable of selectively enlarging a target key on a soft keyboard thereof, in accordance with embodiments of the present invention.

Referring now to FIG. 4, there is illustrated the components of an exemplary electronic device 110 for selectively enlarging a target key on a soft keyboard thereof, in accordance with embodiments of the present invention. The electronic device 110 includes a processor 400 connected to a memory device 410. The processor 400 in combination with the memory device 410 controls the operation of the electronic device 110.

The processor 400 can be a microprocessor, microcontroller, programmable logic device or any other processing device. The memory device 410 can be any type of memory device for use on any type of portable and/or hand-held electronic device 110. For example, the memory device 410 can be a flash ROM, EEPROM, ROM, RAM or any other type of storage device.

In one embodiment, the memory device 410 stores software 420 executable by the processor 400 to track cursor movement and predict from the movement which key on the soft keyboard to enlarge (i.e., the target key). For example, the software 420 can include a prediction algorithm for predicting the target key. In another embodiment, the prediction algorithm is stored in the processor 400, and the memory device 410 stores data used by the processor 400 during the cursor tracking and key enlargement process.

The electronic device 110 further includes the cursor control device 10 and the display 100, as described above. The processor 400 is connected to receive a cursor control signal 430 from the cursor control device 10. The cursor control device 10 generates the cursor control signal 430 when the puck moves in response to a lateral force applied to the puck by the user. The cursor control signal 430 represents the magnitude and direction of puck movement and, hence, of cursor movement. The processor 400 moves the cursor on the display 100, as described above, in response to the cursor control signal 430. In addition, when operating in text-entry mode with a soft keyboard, the processor 400 determines the current cursor position on the display in response to successive cursor control signals 430 and inputs the current cursor position and magnitude and direction of cursor movement to the prediction algorithm being executed by the processor 400. The processor 400 then predicts the target key on the soft keyboard towards which the user is directing the cursor as the target key. Once the target key is identified by the processor 400, the processor 400 sends signals to the display 100 that enlarges the target key relative to the other keys on the soft keyboard to make it easier for the user to select the target key.

In one embodiment, the prediction algorithm includes various types of criterion for use in predicting the target key. One type of criterion is a position criterion related to the respective positions of the cursor and the keys on the soft keyboard. The prediction algorithm uses the cursor control signal 430 to identify a set of keys on the soft keyboard that meet the position criterion. From the identified set of keys, the target key is selected. For example, the prediction algorithm can identify the keys that are located on the soft keyboard in the direction of movement of the cursor as the set of keys that meet the position criterion, and the target key can be the key in the set of keys that has the minimum distance to the cursor.

In an exemplary embodiment, all of the keys on the keyboard are possible target keys, and the prediction algorithm executed by the processor 400 applies five specific position criteria to each key to determine the target key. When all of the position criteria are met for a particular key, the prediction algorithm determines that the particular key is the target key, and the processor 400 enlarges the target key.

The first position criterion is whether the cursor velocity has a finite, non-zero magnitude. If the cursor velocity has a finite, non-zero magnitude, the prediction algorithm determines that the cursor is currently in motion and the user is moving the cursor towards the target key. However, if the cursor velocity does not have a finite, non-zero magnitude, the prediction algorithm determines that the user is currently not moving the cursor towards any key.

The second position criterion is whether the cursor acceleration is less than or equal to zero. If the cursor acceleration is less than or equal to zero, the prediction algorithm determines that the cursor is slowing down, and therefore, may be approaching the target key. If the cursor acceleration is greater than zero, the prediction algorithm determines that the cursor is not approaching the target key (e.g., the target key is not within the immediate vicinity of the cursor).

The third position criterion is applied to each key on the soft keyboard once the prediction algorithm determines that the first two position criteria have been met. The third position criterion is whether the position of the cursor on the display is outside the footprint of the key on the display. If the cursor position is outside the footprint of a particular key, that particular key is included within a first set of keys from which the target key is selected. For example, in one embodiment, assuming a cursor occupies a cursor area on the soft keyboard displayed on the display, the particular key is included within the first set of keys from which the target key is selected if the cursor area does not overlap the key footprint. If the cursor area overlaps the key footprint, and the user has not selected the particular key (e.g., "clicked" on the particular key), the prediction algorithm determines that the particular key is not the target key, and does not include the particular key in the first set of keys from which the target key is selected. In another embodiment, the particular key is not included in the first set of keys if the tip of the cursor lies inside the footprint of the particular key, and the user has not selected the particular key.

The fourth position criterion is applied to each key in the first set of keys. The fourth position criterion is whether the cursor movement vector, i.e., a vector that represents the magnitude and direction of movement of the cursor on the display, is pointing generally towards the key. If the cursor movement vector is pointing generally towards a particular key in the first set of keys, indicating that the user is moving the cursor towards the particular key, the particular key is included within a second set of keys from which the target key is selected. If the cursor movement vector does not point towards the particular key, the prediction algorithm determines that the particular key is not the target key, and does not include the particular key in the second set of keys.

The fifth position criterion is applied to each key in the second set of keys. The fifth position criterion is whether the direction of the cursor movement vector is within a tolerance angle of the key. If the direction of the cursor movement vector is within the tolerance angle of a particular key within the second set of keys, the prediction algorithm determines that the particular key is the target key, as will be described in more detail below in connection with FIG. 5. Although there may be other keys in the second set of keys that are located in the general direction of the cursor movement vector, the prediction algorithm selects, as the target key, the particular key for which the direction of the cursor movement vector is within its tolerance angle. If all of the above position criteria are met by a particular key, the processor 400 determines that the particular key is the target key and enlarges that key.

The processor 400 maintains the enlarged size of the target key until one or more of the above-listed specific position criteria are no longer met. For example, if the user moves the cursor over the enlarged target key, such that cursor area overlaps the key footprint, and the user does not select the enlarged target key within a predetermined time, the processor 400 reduces the size of the enlarged target key and predicts another target key for enlargement using the specific position criteria.

The processor 400 is further connected to receive a select control signal 440 that results from the user "clicking" on (or otherwise selecting) the target key using the cursor control device 10. It should be understood that in other embodiments, the select control signal 440 may be generated by a different device associated with the electronic device 110. If the select control signal 440 is not received by the processor 400 within a predetermined time of the target key being enlarged, the processor 400 informs the prediction algorithm. The prediction algorithm then predicts another key as the target key based on the current position of the cursor on the display as determined from the cursor control signal 430 and one or more criteria, e.g., position criteria and/or word prediction criteria. For example, if the user moves the cursor over the enlarged footprint of the target key and continues to move the cursor to a position overlapping the normal footprint of the target key (i.e., the footprint when the target key is not enlarged) without selecting the target key, the prediction algorithm determines that that enlarged key is not the target key, and selects another key as the target key.

Figure 5:
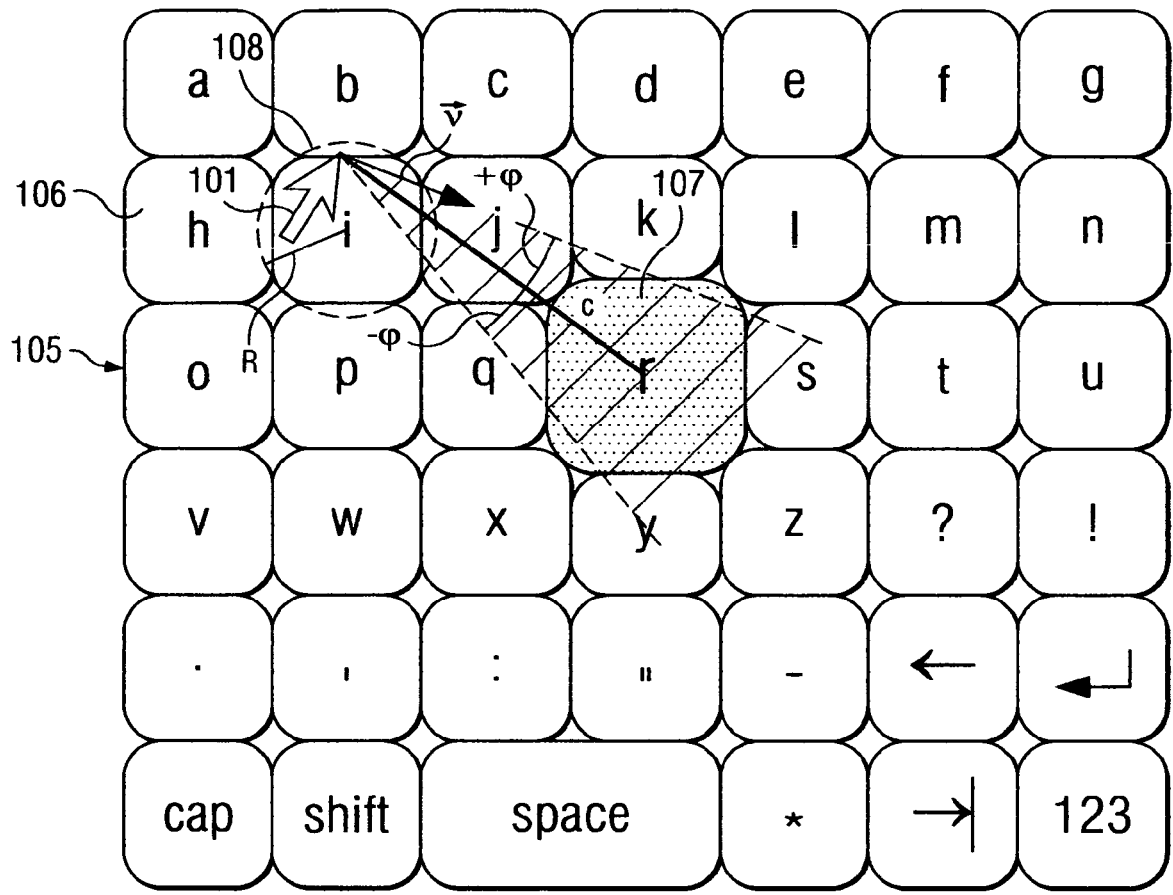
FIG. 5 is a pictorial representation of the selection of a target key on the soft keyboard, in accordance with embodiments of the present invention.

FIG. 5 is a pictorial representation of the selection of a target key 107 on the soft keyboard 105 using position criteria, in accordance with embodiments of the present invention. In FIG. 5, the enlarged target key 107 is the "r" key, which is selected based at least in part on position criteria. A cursor movement vector v indicates the magnitude and direction of movement of the cursor 101 on display 100. For example, the cursor movement vector v can be determined from the cursor control signals 430. A key center vector c represents the magnitude and direction of a straight line connecting the cursor 101 and the center of the "r" key. Ideally, the key center vector c of the target key 107 is coincident with the cursor movement vector v. However, in operation, cursor position and movement depends upon the imprecise user-controlled movement of the cursor control device.

Therefore, an angular tolerance φ around the key center vector c of the target key 107 is used in predicting the target key 107. Specifically, the target key 107 is positioned on the soft keyboard such that the difference between the direction of the cursor movement vector v and the direction of the key center vector c of the target key 107 lies within the angular tolerance φ associated with the target key 107. In other words, the direction of the cursor movement vector v is oriented within the angular tolerance φ of the direction of the key center vector c of the key 106, where φ is the angular tolerance optimized for best operation of the electronic device, soft keyboard, display and application.

For example, in one embodiment, the angular tolerance φ is between ±10 degrees and ±20 degrees. For a particular key 106 to be the target key, the cursor movement vector v lies within the angular tolerance φ of the direction of the key center vector c of that particular key 106. In FIG. 5, the direction of the cursor movement vector v lies within the angular tolerance φ of the direction of the key center vector c of the "r" key, which qualifies the "r" key as a potential target key 107.

It can be seen from FIG. 5 that other keys also qualify as potential target keys. For example, the direction of the cursor movement vector V is also within the tolerance angles of the directions of the key center vectors (not shown) of the "s" key 106, the "j" key 106, the "z" key and the "k" key. These keys (e.g., "r", "S", "j", "z" and "k") form a set of keys that meet the angular tolerance criterion. The target key 107 is selected from this set of keys based on additional position criteria and/or other criteria, e.g., a word completion criterion.

For example, in one embodiment, the target key 107 is selected from the set of keys that meet the angular tolerance criterion by comparing the key center vectors of the keys 106 within the set. In addition, the respective key center vectors associated with each of the keys in the set is compared with the radius R of the escribed circle 108 of each key 106 in the set In one embodiment, the target key 107 is the key in the set whose key center vector has the smallest magnitude (i.e., the smallest distance between the cursor and the center of the key), and whose key center vector magnitude is greater than the escribed circle radius R of the key 106. Thus, if the cursor 101 is located within the escribed circle 108 of a particular key 106 whose key center vector has the smallest magnitude, and the user has not yet selected the key, this key 106 is determined not to be the target key 107. Therefore, the target key 107 is the key 106 whose key center vector has the next-smallest magnitude.

Referring again to FIG. 4, in another embodiment, the type of criterion used by the prediction algorithm to predict the target key is a word prediction criterion related to the specific characters entered (selected) by the user. In this embodiment, the processor 400 uses the cursor control signal 430 to track the movement of the cursor on the display and determines the current position of the cursor on the display when a "click" is detected. The processor 400 further identifies the selected key from the position of the cursor at the "click." In addition, the processor 400 monitors the text entry of a series of selected keys representing the characters of a partial word, and inputs the partial word to the prediction algorithm being executed by the processor 400. The prediction algorithm applies the word prediction criterion to the partial word to identify the target key.

The word prediction algorithm includes one or more linguistic algorithms that implement the word prediction criterion to identify one or more complete words from the entered partial word. An exemplary linguistic algorithm compares the partial word with a list of complete words, and identifies complete words that begin with the partial word. The prediction algorithm selects one of the complete words, and identifies the first character in the complete word following the partial word as a next character. The processor 400 enlarges the key representing the next character as the target key.

In other embodiments, the linguistic algorithm includes one or more of a probability-ranked dictionary, a multi-word back-chain algorithm, a most-recently-used (MRU) text completion algorithm, a structured field text completion algorithm (e.g., "To" and "From" fields or system parameter fields, such as the system time) or an algorithm implementing any other type of word prediction methodology.

In a further embodiment, the prediction algorithm utilizes the word prediction criterion in conjunction with one or more position criteria to predict the target key. For example, the prediction algorithm can use the cursor movement vector to identify a set of keys that meet the position criterion. From the set of keys, the prediction algorithm can identify the complete words that begin with the partial word and that have as the next character one of the keys within the set of keys that meet the position criterion. As an example, if the user entered the partial word "rep," and the letter "l" is in the set of keys that meet the position criterion, the processor 400 can select the complete word "reply" and enlarge the key representing the letter "l." After selection of the letter "l" by the user, the processor can enlarge the letter "y" unless the letter "y" is not within the set of keys that meet the position criterion for the next character entry. For example, if the direction of the cursor movement vector is away from the direction of the letter "y," the prediction algorithm can compare the partial word "repl" with the list of complete words, and select a complete word (e.g., "replicate") whose next character (e.g., "i") is on a key that lies in the current direction of movement of the cursor.

Figure 6:
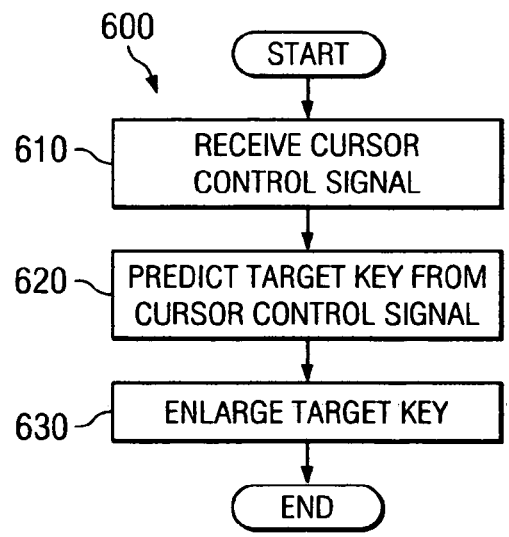
FIG. 6 is a flow chart illustrating an exemplary process for simplifying text entry in an electronic device using a soft keyboard, in accordance with embodiments of the present invention.

FIG. 6 is a flow chart illustrating an exemplary process 600 for simplifying text entry in an electronic device in accordance with embodiments of the present invention. Initially, at block 610, a cursor control signal is received from a cursor control device. The cursor control signal indicates the magnitude and direction of movement of the cursor. In response to the cursor control signal, at block 620, a key on a soft keyboard displayed on the display is predicted as a target key, i.e., as the next key to be selected by the user. At block 630, the target key is enlarged relative to other keys on the soft keyboard to make it easier for the user to select (or "click" on) the target key.

Figure 7:
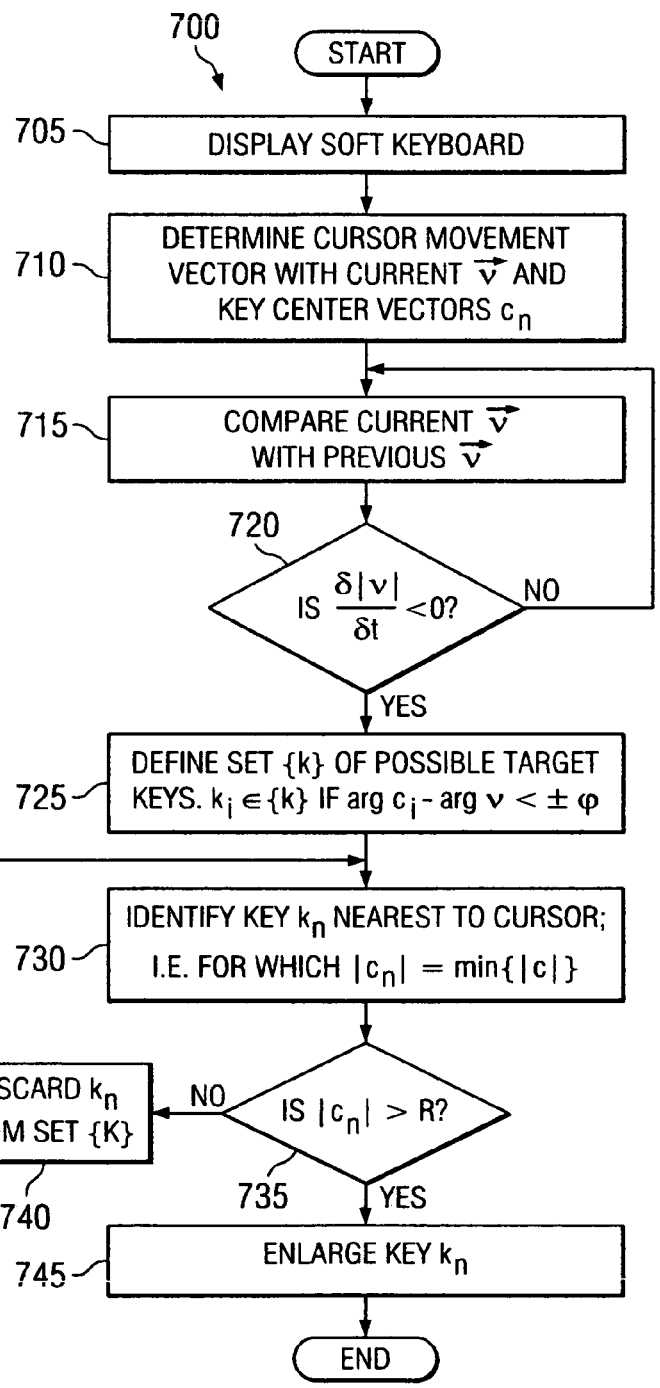
FIG. 7 is a flow chart illustrating a more detailed exemplary process for simplifying text entry in an electronic device using a soft keyboard, in accordance with embodiments of the present invention.

FIG. 7 is a flow chart illustrating a more detailed exemplary process 700 for simplifying text entry in an electronic device in accordance with embodiments of the present invention. Initially, at block 705, the soft keyboard is displayed on a display. At block 710, a cursor movement vector v is determined that represents the magnitude and direction of movement of the cursor on the display. In addition, individual key center vectors for each key on the soft keyboard are determined $c_n$, each representing the magnitude and direction from the current to the center of the key on the soft keyboard.

At block 715, the magnitude of the current cursor movement vector v is compared with the magnitude of one or more previously determined cursor movement vectors to determine the acceleration of the cursor. At block 720, if the acceleration of the cursor is greater than zero, execution returns to block 715, where the current cursor velocity v is again measured. However, if the acceleration of the cursor is less than or equal to zero, at block 725, a set {k} of possible target keys is identified. The set of possible target keys includes each key positioned on the display such that the direction of the cursor movement vector v lies within an angular tolerance φ associated with the key. Specifically, for each key in the set, denoted $k_i$, the cursor movement vector v is within +/−φ of the direction of the key center vector $c_i$ of the key $k_i$, where φ is a tolerance optimized for best operation of the electronic device, soft keyboard, display and application.

From the set of possible target keys {k}, at block 730, the key nearest to the cursor, denoted $k_n$, is identified. The key $k_n$ is identified by comparing the magnitudes of the key center vectors of the keys within the set, and the key whose key center vector has the smallest magnitude is identified as the key with the minimum key center vector $c_n$ (i.e., min{|c|}). At block 735, a determination is made whether the magnitude of the key center vector $c_n$ of the key $k_n$ is greater than the radius R of the escribed circle encompassing the key $k_n$. If $|c_n| \leq R$, the key $k_n$ is discarded from the set of keys {k} at block 740, and a new key $k_n$ is identified as the key whose key center vector has the smallest magnitude $c_n$ (i.e., min{|c|}) from the remaining keys $k_i$ in the set {k}. However, if $|c_n| > R$, the key $k_n$ is enlarged at block 745 to make it easier for the user to select the key $k_n$.

Figure 8:
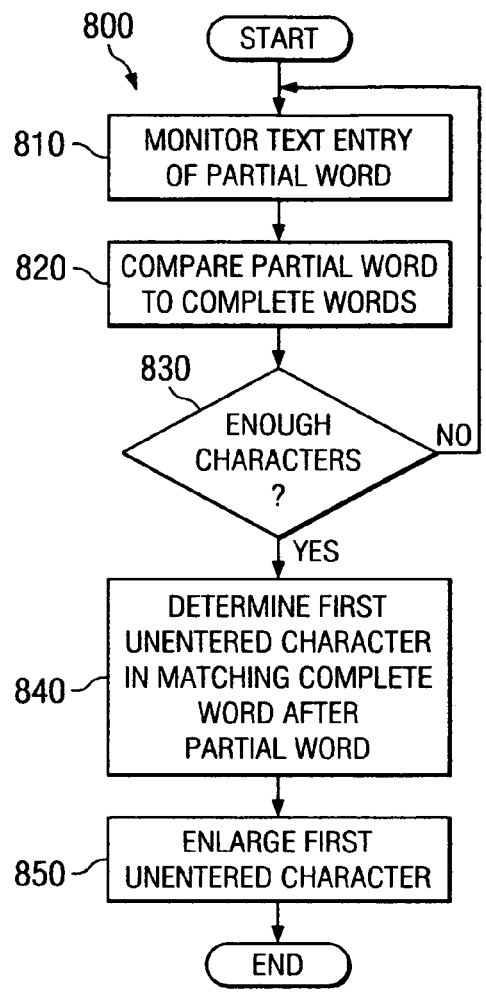
FIG. 8 is a flow chart illustrating another more detailed exemplary process for simplifying text entry in an electronic device using a soft keyboard, in accordance with embodiments of the present invention.

FIG. 8 is a flow chart illustrating another more detailed exemplary process 800 for simplifying text entry in an electronic device, in accordance with embodiments of the present invention. Initially, at block 810, the entry of a series of selected keys representing the characters of a partial word is monitored. At block 820, the entered partial word is compared with a list of complete words. At block 830, a determination is made whether enough characters have been entered to identify a complete word that matches the partial word. Typically, at least three characters are required to adequately identify a complete word from a partial word. If insufficient characters have been entered (e.g., if the number of identified complete words is too large), entry of additional characters in the partial word is monitored at block 810 until a sufficient number of characters have been entered. At block 840, the first character of the complete word following the partial word is determined as a next character, and at block 850, the key representing the next character is enlarged as the target key.

The innovative concepts described in the present application can be modified and varied over a wide rage of applications. Accordingly, the scope of patents subject matter should not be limited to any of the specific exemplary teachings discussed, but is instead defined by the following claims.

I claim:

1. A method for simplifying text entry in an electronic device having a display operable to display a cursor and a soft keyboard, the soft keyboard comprising keys, said method comprising:
   receiving a cursor control signal representing movement of said cursor on said display;
   determining a cursor velocity in response to said cursor control signal, the cursor velocity represented by a cursor movement vector having a magnitude and a direction;
   predicting from amongst a set of potential target keys, one key as likely to be next selected as a target key when said cursor velocity is greater than zero, the set of potential target keys including a) a first key that is an immediate neighbor to a current key on which said cursor is positioned and b) a second key that is not a neighbor to the current key on which said cursor is positioned, and wherein said first and said second keys are located in a direction that is defined by said cursor movement vector and within an angular tolerance of the direction; and
   enlarging said target key on the display relative to others of said keys, which remain unenlarged.

2. The method of claim 1, wherein said predicting further comprises:
   determining a cursor acceleration in response to said cursor control signal; and
   predicting said target key when said cursor acceleration is slowing down thereby indicating approach to said target key.

3. The method of claim 1, wherein each of said keys has a footprint; and said predicting further comprises:
   determining a current position of said cursor on said display based on said cursor control signal;
   determining whether said current position of said cursor on said display is within said footprint of said second key on said display; and
   if said current position is within said footprint of said second key, and said second key has not been activated, excluding said second key from said set of potential target keys.

4. The method of claim 1, wherein said predicting further comprises:
   representing lines between said current position of said cursor and centers of ones of said keys as respective key center vectors, each having respective magnitudes and directions;
   defining said set of potential target keys such that the direction of said cursor movement vector is within said angular tolerance of the direction of said respective key center vectors of each of said keys within said set; and
   identifying from said set a potential key having a minimum magnitude of said respective key center vectors.

5. The method of claim 4, wherein said predicting further comprises:
   identifying said potential key as said target key when said minimum magnitude associated with said potential key is greater than a radius of an escribed circle of said potential key.

6. The method of claim 5, wherein said predicting further comprises:
   identifying an additional potential key from said set when said minimum magnitude associated with said potential key is less than said radius, said additional potential key having a second minimum magnitude of said respective key center vectors; and
   identifying said additional potential key as said target key when said second minimum magnitude associated with said additional potential key is greater than said radius.

7. The method of claim 5, further comprising:
   restoring the size of said enlarged target key when said minimum magnitude associated with said target key is less than said radius and said target key is not selected within a defined time.

8. The method of claim 1, wherein said predicting comprises:
   monitoring entry of a series of selected ones of said keys representing the characters of a partial word; and
   identifying said target key from said partial word.

9. The method of claim 8, wherein said identifying comprises:
   comparing said partial word with a list of complete words beginning with said partial word;
   selecting a word from said list of complete words; and
   identifying a key corresponding to a first character in said word after said partial word as said target key.

10. The method of claim 1, wherein the angular tolerance is less than 360 degrees.

11. The method of claim 10, wherein the angular tolerance is optimized to be substantially between ±10 degrees.

12. An electronic device, comprising:
    a display operable to display a cursor and keys constituting a soft keyboard;
    a cursor control device for controlling movement of said cursor on said display; and
    a processor operable to receive a cursor control signal from said cursor control device, said cursor control signal representing movement of said cursor on said display, and use said cursor control signal to determine a cursor velocity for predicting from amongst a set of potential target keys, one key as likely to be next selected as a target key when said cursor velocity is greater than zero, the set of potential target keys including a) a first key that is an immediate neighbor to a current key on which said cursor is positioned and b) a second key that is not a neighbor to the current key on which said cursor is positioned, and wherein said first and said second keys are located within an angular tolerance of a direction that is defined by a cursor movement vector, wherein said processor is further operable to enlarge said target key relative to others of said keys.

13. The electronic device of claim 12, wherein said processor is further operable to represent lines between a current position of said cursor and centers of ones of said keys as respective key center vectors, each having respective magnitudes and directions, and define a set of said keys such that the direction of said cursor movement vector is within an angular tolerance of the direction of said respective key center vectors of each of said keys within said set, and wherein said processor is further operable to identify a potential key from said set having a minimum magnitude of said respective key center vectors.

14. The electronic device of claim 13, wherein said processor is further operable to identify said potential key as said target key when said minimum magnitude associated with said potential key is greater than a radius of an escribed circle of said potential key.

15. The electronic device of claim 14, wherein said processor is further operable to identify an additional potential key from said set as said target key when said minimum magnitude associated with said potential key is less than said radius, said additional potential key having a second minimum magnitude of said magnitudes of said respective key center vectors, said second minimum magnitude associated with said additional potential key being greater than said radius.

16. The electronic device of claim 12, wherein the cursor control device is a puck-type pointing device comprising:
- a pressure sensor that measures pressure applied upon the puck-type pointing device; and
- a motion sensor that determines the displacement of the puck-type pointing device in response to a lateral force applied to the puck-type pointing device.

17. A method for text entry into an electronic device incorporating a display on which is displayed a soft keyboard, the method comprising:
- receiving a cursor control signal operable to control the position of a cursor upon the soft keyboard;
- detecting from the cursor control signal, a direction and a magnitude of movement of the cursor;
- detecting from the cursor control signal, a slowing down of the cursor indicative of the cursor approaching a target key on the soft keyboard;
- determining a key center vector that represents the magnitude and the direction of a straight line connecting a current position of the cursor to a first target key;
- providing an angular tolerance $\phi$ around the key center vector, the angular tolerance $\phi$ being used to identify a set of potential target keys comprising a) a first key that is an immediate neighbor to a current key that corresponds to the current position of the cursor, and b) a second key that is not a neighbor to the current key, wherein said first and said second keys are located in a direction that is in substantial alignment with said key center vector and within said angular tolerance;
- identifying the target key from the set of potential target keys;
- enlarging the target key relative to other keys on the soft keyboard; and
- reducing in size, a neighboring key of the enlarged target key.

18. The method of claim 17, wherein identifying the target key from the set of potential target keys comprises the use of a word completion criterion.

19. The method of claim 17, wherein identifying the target key from the set of potential target keys comprises the use of a circle having a radius R defining a magnitude criterion that is used in conjunction with the key center vector for identifying the target key.

20. The electronic device of claim 16, wherein the pressure sensor is operable to sense a first pressure level for activating tracking of the cursor on the display, and a second pressure level for providing a click function.

* * * * *